Patented May 14, 1946

2,400,333

UNITED STATES PATENT OFFICE 2,400,333

POLYVINYL ACETAL COMPOSITION

Franklin A. Bent, Berkeley, and Kenneth E. Marple, Oakland, Calif., assignors to Shell Development Company, San Francisco, Calif., a corporation of Delaware No Drawing. Application April 9, 1943, Serial No. 482,514

4 Claims. (Cl. 260—36)

This invention relates to organic plastic compositions containing glycidyl ethers of glycerol as plasticizers.

An object of the invention is the production of novel compositions comprising organic plastic material. Another object is the production of compositions which can be made into thin transparent films of exceptional strength, flexibility and toughness. A further object is the formation of compositions suitable for the preparation of laminated glass resistant to shattering even at low temperatures. A still further object is the provision of compositions which can be formed by calendering, extrusion or molding into films, filaments and massive shapes, and which can be used in the preparation of lacquers. Other objects will be apparent from the description given hereinafter.

These objects are accomplished in accordance with this invention by the use of glycerol glycidyl ethers and thio-ethers as plasticizers for organic plastic material. It has been found that there can be formed from cellulose derivative and synthetic resin compositions containing glycerol mono-, di-, and tri-glycidyl ethers clear, water-white structures of high tensile strength, toughness and flexibility, and that these properties are retained even at sub-zero temperatures.

The following examples, in which parts and percentages are given by weight, will serve to illustrate the invention:

Example I

Polyvinyl butyral resin marketed as "Vinylite X" was blended with 50 parts of glycerol-α, γ-di(methyl isobutyl carbinyl)-β-glycidyl ether per 100 parts of resin. A sheet was formed by milling the composition between heated rolls, followed by pressing between hot, polished metal platens. The material was perfectly clear, water-white, highly flexible and tough. A strip 8 inches long, 2½ inches wide and 0.03 inch thick was subjected to a "chill test" in which the strip was doubled over on itself to ½ its length and held at 0° F. for 4 hours. The folded edge was then placed upon a flat wooden block and struck sharply with a 1½ pound hammer. Careful examination failed to reveal the presence of any cracks or fractures. Another portion of the material was used in making safety glass which satisfactorily passed a standard break test at 0° F., 70° F. and 120° F.

Example II

Polyvinyl butyral resin sold under the trademark "Butvar" was blended with 45 parts of glycerol-α,γ-di(butyl cellosolve)-β-glycidyl ether. A sheet formed from the composition did not fracture when subjected to the "chill test."

Example III 20 parts of the plasticizer-containing composition of Example I were dissolved in 80 parts of a mixture of equal proportions of acetone and methanol. The solution was cast in a thin layer upon a glass plate, the solvent was removed by evaporation and the resulting film was stripped from the glass surface. The film was used as an interlayer in a laminated glass, which satisfactorily passed a break test at 0° F.

Example IV

"Vinylite X" polyvinyl butyral resin was homogeneously mixed with glycerol-α-butyl-β-glycidyl-γ-(methyl isobutyl carbinyl) ether in proportions of 2 parts of resin to 1 of the ether. Safety glass was formed by the autoclave method using an extruded sheet of the composition as interlayer, without added adhesive. When the glass laminae of the safety glass were broken with a hammer at room temperature, the interlayer adhered perfectly to the separate pieces. The test was repeated at 0° F. and at 120° F. with the same result. An unbroken section of the safety glass was exposed to weathering under accelerated conditions. At the end of 6 months substantially no discoloration was apparent and there was no separation of the edges of the laminae.

The compositions of the present invention are homogeneous mixtures of organic plastic material and glycerol glycidyl ethers or thio-ethers. Examples of plastics which may be used are cellulose nitrate, cellulose acetate, cellulose acetopropionate, cellulose acetobutyrate, ethyl cellulose, benzyl cellulose, urea-formaldehyde, phenol-formaldehyde, alkyd resins, polystyrene, polyvinyl acetate, co-polymers of vinyl acetate and vinyl chloride, polyvinyl acetals, and acrylic resins, such as polymethyl methacrylate.

The preferred plastics are the polyvinyl acetal resins, which can be produced by the partial or complete hydrolysis of a polyvinyl ester, followed by the condensation of the resulting polyvinyl alcohol or partial polyvinyl alcohol with an aldehyde. In this application the term "acetal" is used to designate also mixed acetals, ketals, and mixed acetal-ketals. Mixed acetals result from the condensation of polyvinyl alcohol with more than one aldehyde. Ketal formation involves condensation with a ketone, or interchange with another ketal. The most valuable polyvinyl acetal resins produced at the present time are those in which the major proportion of the acetal groups are formed from butyraldehyde. Polyvinyl butyraldehyde acetal resins are used extensively as safety glass interlayers, for which purpose those resins are selected in which the acetal content is between about 42% and about 82% by weight, calculated as polyvinyl butyral.

The plasticizers of the invention have the structure represented by the general formula:

wherein X is O or S and $R_1$, $R_2$ and $R_3$ are the same or different and are hydrogen or organic radicals, at least one being the glycidyl radical. As organic radicals may be mentioned alkyl, alkenyl, alkynyl, alkoxy-alkyl, aralkyl, aryl, acyl, alicyclic, alicarbocyclic, and heterocyclic radicals.

Specific examples of such radicals are methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octodecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, methallyl-phenyl, triallyl-naphthyl, naphthylallyl, 2-phenylethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, pyrrolyl, pyridyl, furyl, butyl carbothionyl, octyl carbothionyl, decyl carbothionyl, etc. Further, these radicals may be substituted with other elements or groups as halogen, hydroxyl, amino, nitro, carbonyl, sulfo, cyano, etc. For example, such substituted radicals may be chlorobutyl, bromo-octyl, nitroethyl, hydroxycyclohexyl, nitrobenzyl, chlorallyl, chlorobenzoyl, tetrahydrofurfuryl, hydroxyethyl, dihydro-isophoryl, sulfo-ethyl, benzene sulfonyl, cyanoacetyl, etc.

A preferred sub-group of plasticizers consists of the saturated alkyl and saturated alkoxy-alkyl diethers of glycerol-β-glycidyl ether. These compounds may be represented by the formula:

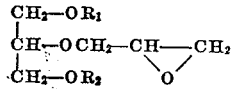

wherein $R_1$ and $R_2$ are the same or different saturated alkyl or alkoxy-alkyl radicals. Of this sub-group, those compounds in which the sum of the number of carbon atoms in the two alkyl or alkoxy-alkyl radicals is at least 9 are favored. Compositions containing them are free from exudation, resistant to aging and exhibit low loss in weight even over long periods of time. Because of these and other properties many of them are suitable for use in safety glass interlayers.

As examples of saturated alkyl and alkoxy-alkyl di-ethers of glycerol-beta-glycidyl ether may be mentioned: glycerol-α-γ-diamyl-β-glycidyl ether, glycerol-α-γ-dihexyl-β-glycidyl ether, glycerol-α-γ-di(methyl propyl carbinyl)-β-glycidyl ether, glycerol-α-γ-di(methyl isopropyl carbinyl)-β-glycidyl ether, glycerol-α-γ-di(methyl butyl carbinyl)-β-glycidyl ether, glycerol-α-γ-di(methyl isobutyl carbinyl)-β-glycidyl ether, glycerol-α-γ-bis(diethyl carbinyl)-β-glycidyl ether, glycerol-α-γ-di(propyl cellosolve)-β-glycidyl ether, glycerol-α-γ-di(butyl cellosolve)-β-glycidyl ether, glycerol-α-γ-di(isobutyl cellosolve)-β-glycidyl ether, glycerol-α-γ-di(methoxy butyl)-β-glycidyl ether, glycerol-α-γ-di(ethoxy propyl)-β-glycidyl ether, glycerol-α-γ-di(butoxy propyl)-β-glycidyl ether, glycerol-α-γ-di(butoxy butyl)β-glycidyl ether, glycerol-α-propyl-β-glycidyl-γ-(methyl butyl carbinyl) ether, glycerol-α-isopropyl-β-glycidyl-γ-(methyl isobutyl carbinyl) ether, glycerol-α-(butyl cellosolve)-β-glycidyl-γ-butyl ether and glycerol-α-(butoxy butyl)-β-glycidyl-γ-butyl ether.

In the case of polyvinyl acetals, the plasticizers may be incorporated with the resin by mixing with the polymer prior to or during the step of condensation with the aldehyde. With all plastics they may be conveniently added by grinding, mixing or milling, or by the use of heated rolls. Volatile solvents may be used to facilitate blending, particularly where the preparation of coating compositions is involved.

The amount of plasticizer employed may vary widely according to the nature and the intended use of the composition. Molded articles ordinarily require less plasticizer than coating compositions and safety glass interlayers. Amounts of a glycerol glycidyl ether as small as 5% by weight of the total composition impart noticeable plasticity thereto. On the other hand, complete compatibility and freedom from exudation characterize compositions in which the plasticizer is present in an amount as great as 75% by weight of the total. For safety glass interlayers the amount of plasticizer will ordinarily vary from about 25% to about 45% by weight of the total composition.

The glycerol glycidyl ethers may be used alone or in conjunction with small amounts of other plasticizers. Where molding, coating and impregnating compositions are involved, there may be added titanium dioxide, zinc oxide, carbon black, wood flour and other common pigments and fillers, as well as dyes and other modifiers. Polyvinyl acetal resins are advantageously stabilized against decomposition by the addition of a small amount of an organic base or other stabilizing substance known to those skilled in the art.

The plasticizers of the present invention show little tendency to evaporate from the prepared compositions containing them, even over long periods of time. The loss due to volatility in blending on heated equipment is small.

The compositions of the invention find use in a variety of applications. In granular and pellet form they serve for compression and injection molding. Filaments and films may be formed by dry or wet spinning in the presence or absence of solvent. Solutions of the compositions may be cast in thin layers upon a polished surface, followed by the evaporation of the solvent. Films so formed find use as supports for light-sensitive photographic emulsions, for wrapping tissues and for the manufacture of shatter-proof glass.

Shaped structures comprising polyvinyl acetal resins plasticized with glycerol glycidyl ethers are clear and water-white. They possess high tensile strength and flexibility even at low temperatures. The polyvinyl butyral compositions included in the ambit of this invention display remarkable adhesiveness for glass in the preparation of safety glass sandwiches with heat and pressure in accordance with any of the usual methods. This adhesiveness is retained in the prepared product even at sub-zero temperatures.

Solutions of compositions comprising polyvinyl acetals and glycerol glycidyl ethers are used for the coating and impregnating of fabric. Material so formed is ideally adapted for the manufacture of raincoats, tents and other articles which are required to be water-proof. For this purpose, it is preferred to modify the polyvinyl acetal resin by the incorporation of a small amount of a thermosetting resin.

We claim as our invention:

1. A composition comprising a polyvinyl acetal and a glycidyl ether of glycerol.

2. A composition adapted for use in safety glass interlayers comprising a polyvinyl butyral resin and a glycidyl ether of glycerol.

3. A composition comprising a polyvinyl acetal resin and an ether of glycerol wherein the hydrogen atom of one of the hydroxyl groups is substituted by a glycidyl radical and the hydrogen atoms of the other two hydroxyl groups are substituted by alkyl groups.

4. A composition comprising a polyvinyl acetal resin and 25 to 45 per cent by weight of glycerol-$\alpha,\gamma$-di(methyl isobutyl carbinyl)-$\beta$-glycidyl ether.

FRANKLIN A. BENT.
KENNETH E. MARPLE.